(12) United States Patent
Singh et al.

(10) Patent No.: US 7,633,855 B2
(45) Date of Patent: Dec. 15, 2009

(54) SYSTEM AND METHOD FOR RESOLVING ADDRESS CONFLICTS IN A NETWORK

(75) Inventors: Pradeep Singh, San Jose, CA (US); David Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 651 days.

(21) Appl. No.: 11/265,917

(22) Filed: Nov. 3, 2005

(65) Prior Publication Data

US 2007/0097992 A1    May 3, 2007

(51) Int. Cl.
*G01R 31/08* (2006.01)
*G06F 15/16* (2006.01)
*G06F 11/00* (2006.01)

(52) U.S. Cl. .................. 370/216; 709/245; 714/53
(58) Field of Classification Search .............. None
See application file for complete search history.

(56) References Cited

U.S. PATENT DOCUMENTS

| | | | |
|---|---|---|---|
| 6,567,408 B1 * | 5/2003 | Li et al. ............ | 370/395.31 |
| 6,883,034 B1 | 4/2005 | Pelavin et al. | |
| 6,917,626 B1 | 7/2005 | Duvvury | |
| 7,092,990 B2 * | 8/2006 | Goodman et al. ...... | 709/203 |
| 7,246,272 B2 * | 7/2007 | Cabezas et al. ........ | 714/53 |
| 2004/0081122 A1 * | 4/2004 | Koodli et al. ........ | 370/329 |
| 2005/0240656 A1 * | 10/2005 | Blair ................ | 709/213 |
| 2006/0013136 A1 * | 1/2006 | Goldschmidt et al. ... | 370/235 |
| 2006/0106879 A1 * | 5/2006 | Zondervan et al. ..... | 707/200 |
| 2007/0183346 A1 * | 8/2007 | Thubert et al. ....... | 370/254 |

FOREIGN PATENT DOCUMENTS

WO    WO 0228048    4/2002

* cited by examiner

*Primary Examiner*—Ayaz R Sheikh
*Assistant Examiner*—Sori A Aga
(74) *Attorney, Agent, or Firm*—Trellis IP Law Group, PC (57) ABSTRACT

A system for resolving address conflicts in a network. In an illustrative embodiment, the system includes an address-configuration module that is adapted to assign addresses to one or more devices. The one or more devices are connected to the network via device interfaces. An interface-monitoring module communicates with the address-configuration module. The interface-monitoring module is adapted to determine when an address conflict involving plural addresses occurs and to provide a signal in response thereto. A conflict-resolution module is adapted to selectively terminate one or more device interfaces associated with the plural addresses in response to the signal and based on the addresses and one or more predetermined precedence rules. In a more specific embodiment, the system further employs a user interface for facilitating selectively adjusting the precedence rules. The conflict-resolution module runs one or more routines adapted to implement a static conflict-resolution policy, a longest-prefix policy, a highest-address policy, and/or an interface-identifier policy for Internet Protocol (IP) addresses.

20 Claims, 3 Drawing Sheets

SYSTEM AND METHOD FOR RESOLVING ADDRESS CONFLICTS IN A NETWORK

BACKGROUND OF THE INVENTION

This invention is related in general to networks and more specifically to systems and methods for resolving conflicts associated with network device addresses.

Systems and methods for avoiding and/or resolving address conflicts are employed in various applications including Local Area Network (LANs) and Internet Applications. Devices connected to these networks are often associated with plural addresses, such as Media Access Control (MAC) and Internet Protocol (IP) addresses. Such networks demand address-assignment and conflict-resolution systems that effectively balance the need for network-address assignment versatility with network priorities.

Systems for effectively assigning addresses and resolving address conflicts are particularly important in IP-addressing applications, where dynamic IP-address assignment is increasingly used. In such applications, IP addresses are often automatically assigned to network devices upon connecting to a network. Unfortunately, such dynamic address assignment may result in devices being assigned conflicting IP addresses. Conventionally, network connections associated with conflicting IP addresses are terminated, which degrades network utility and fault tolerance. Alternatively, IP address configurations are limited to those that cannot result in conflicts. Unfortunately, limiting IP address configurations is impractical for many applications, especially applications involving devices with multiple nodes running distributed IP protocol stacks that have high IP-address availability requirements.

DETAILED DESCRIPTION OF EMBODIMENTS OF THE INVENTION

A preferred embodiment of the present invention implements a system for effectively resolving conflicting network-device addresses in accordance with network priorities. The system includes an address-configuration module that is adapted to assign addresses to one or more devices that are connected to the network via device interfaces. An interface-monitoring module communicates with the address-configuration module. The interface-monitoring module provides a signal when an address conflict involving plural addresses occurs. The system further includes a conflict-resolution module that selectively terminates one or more device interfaces associated with the plural addresses in response to the signal and based on one or more predetermined precedence rules. The system allows users, such as network administrators, to selectively terminate interfaces according to network priorities while preserving interface configuration flexibility.

For clarity, various well-known components, such as power supplies, communications ports, hubs, modems, gateways, firewalls, network cards, host bus adapters, Internet Service Providers (ISPs), Application Programming Interfaces (APIs), and so on, have been omitted from the figures. However, those skilled in the art with access to the present teachings will know which components to implement and how to implement them to meet the needs of a given application.

Figure 1:
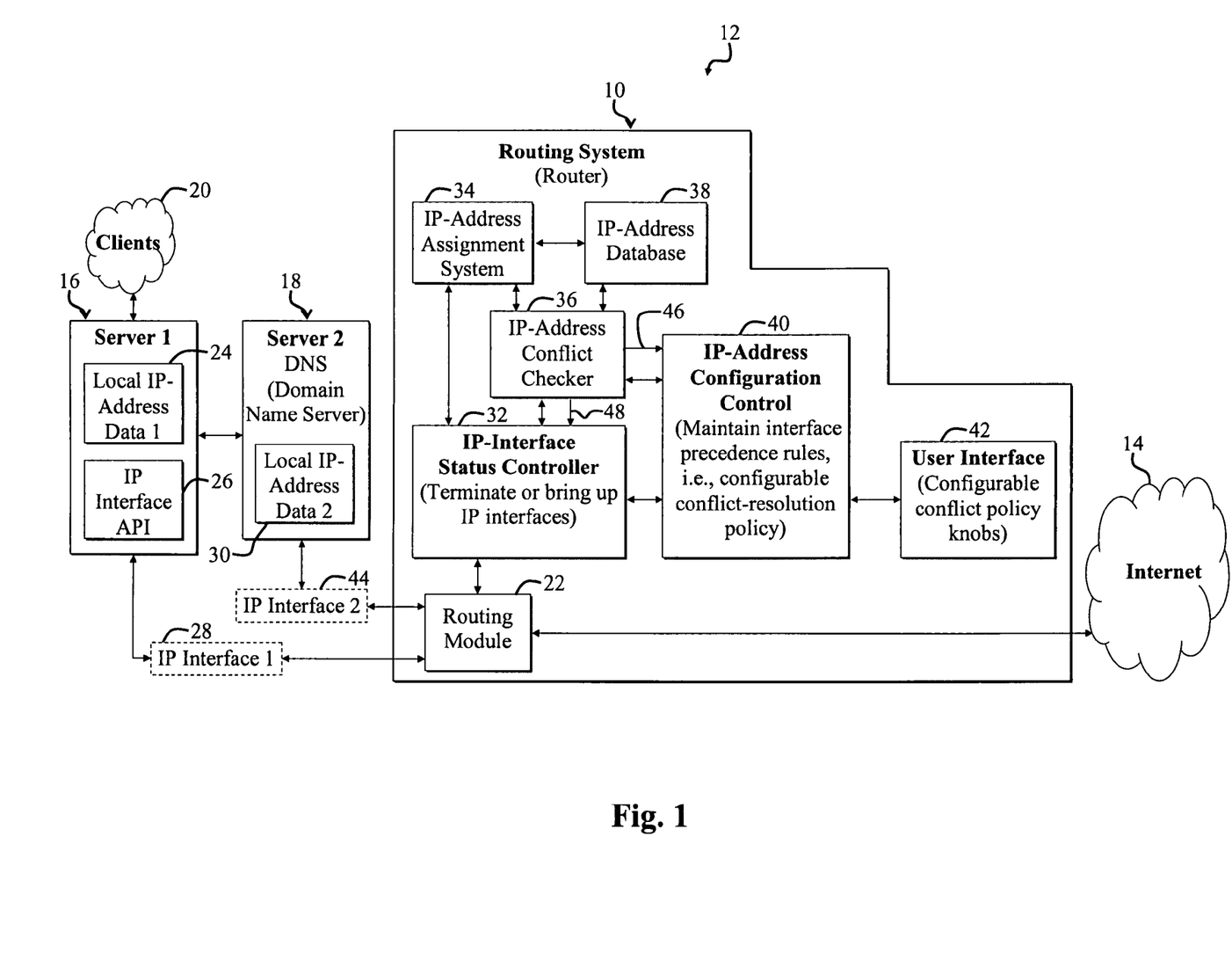
FIG. 1 is a diagram illustrating key functional blocks of a system for resolving IP address conflicts according to a first embodiment of the present invention.

FIG. 1 is a diagram illustrating a system 10 for resolving IP address conflicts in a network 12 according to a first embodiment of the present invention. In the present specific embodiment, the system 10 is implemented in a routing system 10. The routing system 10 is connected between a packet-switched network, such as the Internet 14 and plural servers, such as a first server 16 and a second server 18. For illustrative purposes, the first server 16 is an application server that communicates with plural clients 20 and with the second server 18, which acts as a Domain Name Server (DNS).

The first server 16 locally maintains a first set of local Internet-Protocol (IP) address data 24 and runs an IP-Interface Application Programming Interface (API) 26. The first server 16 communicates with a routing module 22 of the routing system 10 via a first Internet-Protocol (IP) interface 28.

The second server 18 maintains a second set of local IP-address data 30 and communicates with the routing module 22 via a second IP interface 44. The routing module 22 also communicates with the Internet 14 and selectively routes communications between the Internet 14 and the servers 16, 18 and clients 20.

For the purposes of the present discussion, an IP interface may be a network connection between a network device, such as a client, server, or other node of an IP network, such as the Internet. Typically, an IP interface is associated with one or more IP addresses, which are associated with one or more devices on different ends of the IP interface.

The routing system 10 includes the routing module 22, an IP-interface status controller 32, an IP-address assignment system 34, an IP-address conflict checker 36, an IP-address database 38, an IP-address configuration control module 40, and a user-interface 42. In the present specific embodiment, the IP-interface status controller 32 communicates with the routing module 22, the IP-address assignment system 34, the IP-address conflict checker 36, and the IP-address configuration control module 40. The IP-address conflict checker 36 further communicates with the IP-address assignment system 34, the IP-address database 38, and the IP-address configuration control module 40. IP-address assignment system 34 further communicates with the IP-address database 38 and the IP-address conflict checker 36. The IP-address configuration control module 40 further communicates with the user-interface 42.

In operation, the IP-address assignment system 34 selectively retrieves IP addresses and associated information from the IP-address database 38 as needed to configure the IP interfaces 44, 28 between the routing system 10 and the servers 16, 18. In certain implementations, the IP-address assignment system 34 may access IP-address conflict information maintained by the IP-address conflict checker 36 and/or the IP-address database 38 to reduce IP-address conflicts upon initial configuration. In other implementations, conflicting IP addresses are not rejected at configuration time, as this may reduce network scalability.

In the present specific embodiment, the IP-address conflict checker 36 maintains a conflict database, which stores IP-address conflict sets. IP-address conflict sets are sets of IP-addresses that conflict with each other in one or more ways.

The IP-address conflict checker 36 may reference conflict-set information to determine if a particular interface 28, 44 is associated with an address that conflicts with one or more IP addresses.

In certain applications, rejection of any conflicting IP addresses at configuration time is undesirable and may limit network utility or functionality. In these applications, the IP-address assignment system 34 may not check IP address assignments via the IP-address conflict checker 36 before assigning IP addresses to the servers 16, 18. The IP-address assignment system 34 forwards IP-address assignment instructions to the IP-interface status controller 32, which employs the routing system 22 to facilitate bringing up IP interfaces 28, 44, i.e., to establish connections between the routing module 22 and the servers 16, 18. In the present specific embodiment, only two interfaces 28, 44 are shown. However, in practice, the routing system 10 may interface tens, hundreds, or more network devices, such as the servers 16, 18, with the Internet 14.

The IP-address conflict checker 36 employs the IP-interface status controller 32 and the routing module 22 to monitor the interfaces 28, 44 for IP address conflicts. When an address conflict is detected by the IP-address conflict checker 36, IP addresses involved in the conflict, such as the first local IP address 24 and the second local IP-address 30, are forwarded to the IP-address configuration control module 40 via a first signal 46. The IP-address configuration control module 40 then determines the relative priority of each address involved in the conflict. Resulting IP-address priority, i.e., precedence information is then forwarded to the IP-interface status controller 32, which terminates lower priority addresses as needed to eliminate the detected IP-address conflicts. This precedence information may be forwarded to the IP-interface controller 32 as priority-value tag information associated with each IP address. The assignment rules for assigning priorities to IP addresses may be established and/or modified by a user, such as a network administration, via the user interface 42.

Alternatively, IP-interface status controller 32 responds to a conflict-detection signal 48 output by the IP-address conflict checker 36 by retrieving predetermined address-precedence rules from the IP-address configuration control module 40. The IP-interface status controller 32 then runs one or more routines to terminate IP interfaces associated with lower precedence values to eliminate the detected IP-address conflicts.

Functionality implemented via the various modules 32-42 of the routing system 10 may be spread differently among the modules 22-42 or may be implemented via one or more different modules without departing from the scope of the present invention. For example, functionality implemented via the IP-address conflict checker 36 may be implemented in the IP-interface status controller 32; functionality implemented via the IP-address database 38 may be integrated with the IP-address assignment system 34; and so on. In certain implementations, the various modules 32-40 of the routing system 10 may be implemented via an Address Repository Manager (ARM), which may be ordered through Cisco Systems, Inc.

Furthermore, the various modules 32-42 may be called by different names. For example, the IP-address conflict checker 36 acts as an interface-monitoring module. The IP-interface status controller 32 and the IP-address configuration control module 40 act together as a conflict-resolution module. The IP-address assignment system 34 and the IP-address database 38 act together as an address-configuration module.

In the present specific embodiment, the IP-address configuration control module 40 maintains interface precedence rules comprising a configurable conflict-resolution policy. The conflict-resolution policy may include configuration tables specifying which types of configurations are allowed under the present conflict-resolution policy.

The conflict-resolution policy is configurable via the user interface 42, which may include one or more policy knobs. A user may turn the knobs to selectively activate different conflict resolution policies. Examples of configurable and/or selectable conflict-resolution policies that may be implemented via the system 12 include a static policy, a longest-prefix policy, a highest-IP address policy, and a lowest interface-identifier policy.

The static policy is implemented via one or more routines running on the IP-address configuration control module 40. The static policy involves giving precedence to IP-addresses involved in a conflict based on when the IP addresses were established. For example, a static policy may involve allowing the first interface established to remain up in the event of a conflict. All subsequent interfaces associated with IP-addresses that conflict with the IP-address associated with the initially established interface are terminated, i.e., brought down, when a conflict occurs. Hence, all subsequent interfaces that conflict with earlier-configured IP-addresses associated with established interfaces, i.e., up interfaces, are terminated before the earlier-established interfaces are terminated.

The conflicts are detected by the IP-address conflict checker 36, which forwards the conflict signal 46 to the IP-address configuration control module 40 in response to the detection of a conflict. The conflicting addresses are terminated via the IP-interface status controller 32 in response to control signaling received from the IP-address configuration control module 40 directly or in response to control signaling received from the IP-address configuration control module 40 by way of the IP-address conflict checker 36.

Similarly, the longest-prefix policy involves assigning precedence values to IP addresses and/or accompanying interfaces in accordance with IP-address prefix length. IP-addresses and associated interfaces are terminated based on the precedence vales associated with each IP-address involved in a conflict, wherein the precedence values vary depending on the IP-address prefix length. For example, in one implementation, the longest-prefix policy involves allowing interfaces with longer prefixes to remain up in the event of a conflict. For example, if three interfaces A, B, and C are associated with IP addresses 1.1.1.1/24, 1.1.2.1/24, 1.1.3.1/16, respectively, then interfaces A and B are assigned higher precedence values by the IP-address configuration control module 40, and consequently, are allowed to remain up, while interface C is terminated. Terminating interface C eliminates the conflict. This policy minimizes the number of interfaces affected by a conflicting configuration. Alternatively, IP-addresses with shorter prefixes are given priority in conflicts.

Similarly, the highest-IP address policy involves assigning precedence values, via the IP-address configuration control module 40, to interfaces, such as the IP interfaces 28, 44 of FIG. 1, according to the values of the IP addresses. Consequently, in the present embodiment, when a conflict occurs, IP addresses associated with lower IP addresses are terminated before IP addresses associated with higher IP addresses, or vice versa, depending on the configuration details of the policy. The configuration details may be selected via a user, such as an administration, employing the user interface 42. In a specific example, a conflict occurs between interfaces A, B, and C with addresses 1.1.1.1/24, 1.1.2.1/24, and 1.1.3.1/16, respectively. In accordance with one highest-IP address policy, interface C is allowed to remain up while interfaces A and B are terminated, since interface C is associated with a higher IP address. This policy allows a network administrator to assign higher IP addresses to more crucial interfaces in the system 10 and thereby reduce negative effects of a conflicting configuration. Alternatively, lower-IP addresses are given priority in conflicts.

In the lowest interface-identifier policy, IP addresses are assigned precedence values, i.e., are prioritized by the IP-address configuration control module 40, based on one or more predetermined interface identifiers. For example, in one implementation, addresses associated with the lower interface identifiers are allowed to remain up, while interfaces associated with higher interface identifiers are terminated when conflicts occur. In a more specific example, suppose three interfaces are associated with interface identification numbers 1, 2, and 3. Further suppose the interfaces are associated with IP addresses 1.1.1.1/24, 1.1.2.1/24, and 1.1.3.1/16, respectively. In this case, the first interface (with ID 1) is allowed to remain up, while interfaces 2 and 3 are terminated, since they are associated with lower interface identifier numbers. This allows the network administrator to readily prioritize interfaces by their identifiers or rack/slot numbers if they are embedded in the identifier.

Other methods for prioritizing IP-addresses and associated interfaces to facilitate determining which interfaces should be terminated when a conflict occurs may be employed without departing from the scope of the present invention. For example, IP addresses and interfaces may be prioritized according to how they are used.

Figure 2:
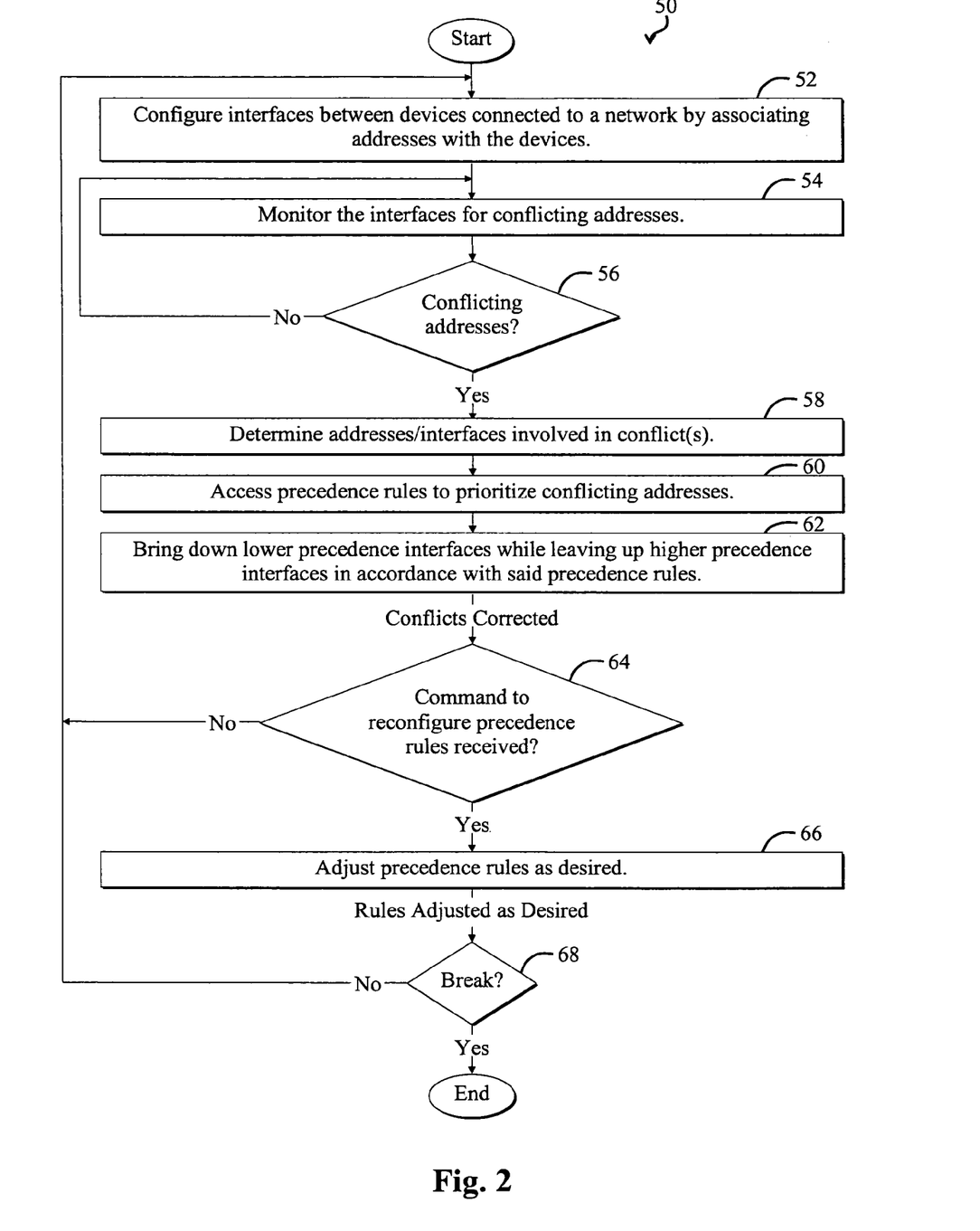
FIG. 2 is a flow diagram of a first method adapted for use with the system of FIG. 1.

FIG. 2 is a flow diagram of a first method 50 adapted for use with the system 10 of FIG. 1. With reference to FIGS. 1 and 2, the method 50 includes an initial configuration step 52, wherein interfaces 28, 44 between devices 16, 18 connected to a network 12 are associated with addresses, such as IP addresses. If the interfaces 28, 44 are already configured, then a subsequent monitoring step 54 is performed. In the system 10 of FIG. 1, the interfaces 28, 44 are established between the first server 16 and the routing system 10 and between the second server 18 and the routing system 10.

The monitoring step 54 involves monitoring the interfaces 28, 44 for conflicting IP addresses via the IP-address conflict checker 36 and accompanying IP-interface status controller 32. If conflicting addresses are detected as verified by a subsequent conflict-verification step 56, then an address-determination step 58 is performed next. Otherwise, the monitoring step 54 continues.

The address-determination step 58 involves determining which addresses are involved in the conflict. The conflicting addresses 24, 30 may comprise a conflict set with several addresses. IP addresses in the conflict set are then analyzed, such as by the IP-interface status controller 32, with respect to the configurable conflict-resolution policy maintained by the IP-address configuration control module 40 in a precedence-determining step 60.

In a subsequent interface-terminating step 62, the IP-interface status controller 32 terminates addresses that are associated with lower precedence values as determined by the conflict-resolution policy until conflicts are resolved. Exact details defining the numbers of addresses terminated for a given conflict set are application specific and may be readily determined by those skilled in the art with access to the present teachings to meet the needs of a given application.

After termination of lower priority conflicting IP addresses and associated interfaces in the interface-terminating step 62, a configuration-checking step 64 is performed. The configuration-checking step 64 involves determining if a user, such as a network administrator, employs the user interface 42 to reconfigure conflict-resolution policy maintained by the IP-address configuration control module 40. If the user interface 42 is being employed to reconfigure the precedence rules, i.e., the conflict resolution policy, then a policy-adjustment step 66 is performed. Otherwise, the configuration step 52 continues as needed.

The policy-adjustment step 66 includes adjusting precedence rules or other IP-address configuration policy parameters as needed in response to input from the user interface 42. When the configuration rules are adjusted as desired, a break-checking step 68 is performed, wherein if a system break occurs, the method 50 completes. Otherwise, the method continues with the initial configuration step 52. A system break may occur in response to a network outage, an off command, or other incident.

The order of the various steps 52-68 of the method 50 may be adjusted without departing from the scope of the present invention. For example, the break-checking step 68 may occur anywhere within the method 50, or multiple instances of the break-checking step 68 may occur. Furthermore, certain steps may be omitted or combined with other steps without departing from the scope of the present invention.

Figure 3:
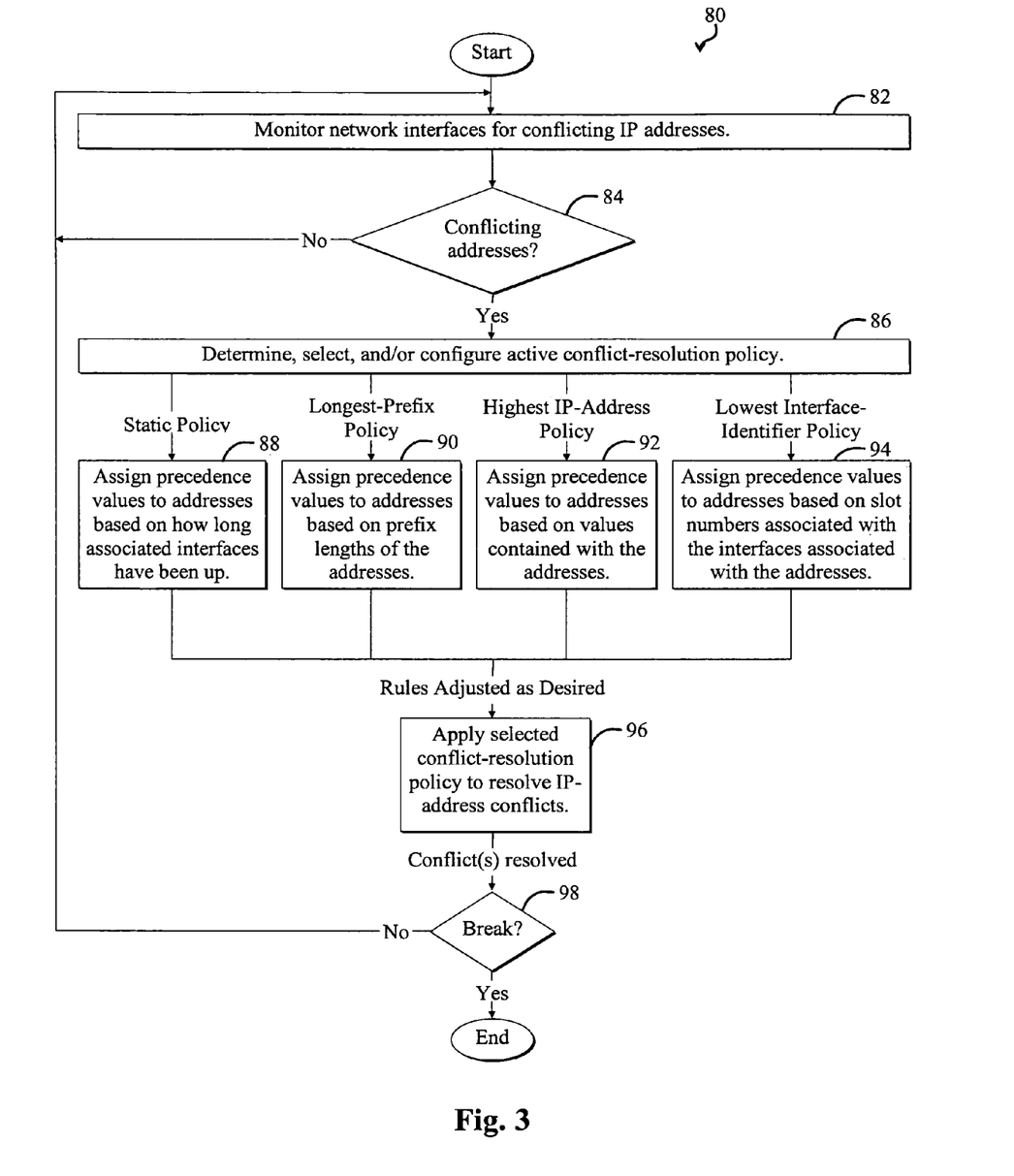
FIG. 3 is a flow diagram of a second method adapted for use with the system of FIG. 1.

FIG. 3 is a flow diagram of a second method 80 adapted for use with the system 10 of FIG. 1. With reference to FIGS. 1 and 3, the method 80 includes an initial monitoring step 82, wherein network interfaces, such as the interfaces 28, 44 of FIG. 1, are monitored for conflicts by the conflict checker 36 of FIG. 1. Upon detection of an IP-address conflict associated with the interfaces 28, 44, as verified by a subsequent conflict-confirmation step 84, a policy-determination step 86 is performed. Otherwise, the monitoring step 82 continues.

In the present operative scenario, the policy-determination step 86 involves the IP-address conflict checker 36 referring to the IP-address configuration module 40 to determine which conflict-resolution policy has been selected via the user-interface 42. If a static policy has been selected, then a static-policy step 88 is performed next. Similarly, if a longest-prefix policy has been selected, then a longest-prefix policy step 90 is performed next. Similarly, if a highest IP-address policy is selected, then a highest IP-address step 92 is performed next. If a lowest interface-identifier policy is selected, then a lowest interface-identifier step 94 is performed next.

In the method 80, the static-policy step 88 involves assigning precedence values to addresses based on how long associated interfaces have been up. The longest-prefix policy step 90 involves assigning precedence values to IP addresses based on prefix lengths of the addresses. The highest IP-address policy step 92 involves assigning precedence values to IP addresses based on values contained within the addresses. The lowest interface-identifier policy step 94 involves assigning precedence values to IP addresses based on slot numbers of other identification numbers associated with the interfaces that are associated with the IP addresses.

Subsequently, upon completion of one or more of the policy steps 88-94, a conflict-resolution step 96 is performed. The conflict-resolution step 96 involves resolving the conflicts detected in the monitoring step 82 according to the policy that was selected and/or configured in the policy-determination step 86 and associated policy steps 88-94. After conflicts are resolved via the conflict-resolution step 96, the method 80 continues with the monitoring step 82 unless a system break occurs in a subsequent break-checking step 98, after which the method 80 terminates.

The order of the various steps 82-98 of the method 80 may be adjusted without departing from the scope of the present invention. For example, the break-checking step 98 may occur anywhere within the method 80, or multiple instances of the break-checking step 98 may occur. Furthermore, certain steps may be omitted or combined with other steps without departing from the scope of the present invention.

Hence, with reference to FIGS. 1-3, the methods 50, 80 of FIGS. 2 and 3 illustrate unique methods employable by the system 10 of FIG. 1 to provide configurable conflict-resolution policies for sets of conflicting IP addresses. The conflicting IP addresses are associated with devices connected to a network via one or more IP interfaces. Use of one or more of the present methods 50, 80 may particularly reduce network outages associated with devices that cannot or otherwise do not reject IP address upon initial configuration. The methods 50, 80 are particularly useful to network device administrators that wish to maximize network up time while not being compromised by a restriction to eliminate potential address conflicts at configuration time. Use of the configurable conflict resolution policies may prevent higher priority interfaces from being terminated upon detection of a conflicting configuration, i.e., when conflicts occur.

Methodologies disclosed herein may be employed to resolve various types of address conflicts according to network priorities, which may be established through user-configurable conflict-resolution policies and address-precedence rules. Unlike conventional systems, embodiments of the present invention may facilitate enabling network devices, such as routing systems, to efficiently establish IP interfaces without limiting initial interface configurations to those that cannot potentially conflict. Certain embodiments of the present invention further enable customizable conflict-resolution policies that enable network devices to selectively terminate conflicting IP interfaces in accordance with network priorities.

While certain embodiments of the present invention are discussed with reference to systems and methods for resolving IP-address conflicts and associated interface-conflicts, the present invention is not limited thereto. Systems and methods disclosed herein may be readily adapted by those skilled in the art to meet the needs of different applications. For example, the systems and methods disclosed herein may be employed to resolve conflicts between MAC addresses or other types of device addresses. Furthermore, many types of networks, either wired or wireless or combinations thereof, may benefit systems constructed according to the embodiment of the present invention. Any acceptable architecture, topology, protocols, or other network and digital processing features can be employed. In general, soft switches, routers, access points, clients, and so on, can be implemented via any device with processing ability or other requisite functionality.

Although processes of the present invention and the hardware executing the processes may be characterized by language common to a discussion of the Internet (e.g., "client," "server," "peer"), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a Personal Digital Assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using one or more programmed general purpose digital computers; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system for resolving address conflicts in a network, the system comprising:
   an address-configuration module in a network device adapted to assign Internet Protocol (IP) addresses to one or more devices, the one or more devices being coupled to the network via one or more device interfaces in an UP state to establish an IP connection from the network device through the one or more device interfaces on the network to the one or more devices to allow IP connectivity, the addresses being assigned by the network device wherein an address conflict occurs in a plurality of device interfaces in the UP state;
   an interface-monitoring module in the network device in communication with the address-configuration module, the interface-monitoring module being adapted to determine when an address conflict occurs between the plurality of device interfaces and to provide a signal in response thereto, the address conflict involving plural addresses for the plurality of device interfaces, wherein the IP connection is established before the address conflict is determined; and
   a conflict-resolution module that is adapted to employ one or more predetermined precedence rules to analyze the plural addresses for the plurality of device interfaces in the UP state and selectively terminate, in response to the signal, one or more device interfaces associated with the plural addresses, wherein termination of the one or more device interfaces brings one or more connections to terminate IP connectivity to the one or more device interfaces.

2. The system of claim 1 further including:
   a user interface in communication with the conflict-resolution module, the user interface adapted to facilitate selectively adjusting the precedence rules.

3. The system of claim 1 wherein the conflict-resolution module includes:
   one or more routines adapted to implement a static conflict-resolution policy.

4. The system of claim 3 wherein the static conflict-resolution policy includes:
   instructions to give earlier-established addresses precedence over later-established addresses and to terminate interfaces associated with later-established addresses before terminating interfaces associated with earlier-established addresses in response to the signal.

5. The system of claim 1 wherein the conflict-resolution module includes:
   one or more routines adapted to implement a longest-prefix policy.

6. The system of claim 5 wherein the longest-prefix policy includes:
   instructions to give addresses exhibiting longer prefixes precedence over addresses exhibiting shorter prefixes and to terminate interfaces associated with addresses with shorter prefixes before terminating interfaces associated addresses with longer prefixes in response to the signal.

7. The system of claim 1 wherein the conflict-resolution module includes:
one or more routines adapted to implement a highest-address policy.

8. The system of claim 7 wherein the highest-address policy includes:
instructions to give addresses exhibiting higher IP addresses precedence over IP addresses exhibiting lower IP addresses and to terminate interfaces associated with lower IP addresses before terminating IP addresses associated with higher IP addresses in response to the signal.

9. The system of claim 1 wherein the conflict-resolution module includes:
one or more routines adapted to implement an interface-identifier policy.

10. The system of claim 9 wherein the interface-identifier policy includes:
instructions to establish address precedence values based on interface-identifiers and to terminate interfaces associated with lower precedence values in response to the signal.

11. A system for resolving address conflicts in a network, the system comprising:
first means for assigning, by a network device, Internet Protocol (IP) addresses to one or more devices of the network, the one or more devices being coupled to the network via one or more device interfaces in an UP state to establish an IP connection from the network device through the one or more device interfaces on the network to the one or more devices to allow IP connectivity, the addresses being assigned by the network device wherein an address conflict occurs in a plurality of device interfaces in the UP state;
second means for establishing address precedence rules;
third means for monitoring, by the network device, the network for address conflicts between the plurality of device interfaces and providing a signal in response thereto, wherein the IP connection is established before the address conflict is determined; and
fourth means for selectively analyze the plural addresses for the plurality of device interfaces in the UP state and terminating one or more device interfaces for the plurality of device interfaces based on the precedence rules and in response to the signal, wherein termination of the one or more device interfaces brings one or more connections to terminate IP connectivity to the one or more device interfaces.

12. A method for resolving address conflicts in a network, the method comprising:
assigning, by a network device, Internet Protocol (IP) addresses to one or more devices of the network, the one or more devices being coupled to the network via one or more device interfaces in an UP state to establish an IP connection from the network device through the one or more device interfaces on the network to the one or more devices to allow IP connectivity, the addresses being assigned by the network device wherein an address conflict occurs in a plurality of device interfaces in the UP state;
establishing address precedence rules;
monitoring, by the network device, the network for address conflicts between the plurality of device interfaces and providing a signal in response thereto, wherein the IP connection is established before the address conflict is determined; and
selectively analyzing the plural addresses for the plurality of device interfaces in the UP state and terminating one or more device interfaces for the plurality of device interfaces based on the precedence rules and in response to the signal, wherein termination of the one or more device interfaces brings one or more connections to terminate IP connectivity to the one or more device interfaces.

13. The method of claim 12 further including:
changing the precedence rules based on input received from a user using a user interface.

14. The method of claim 13 wherein the address conflicts include:
Internet Protocol (IP) address conflicts.

15. An apparatus for resolving address conflicts in a network comprising:
one or more computer processors;
a machine-readable storage medium including instructions executable by the one or more computer processors for
assigning, by the one or more computer processors, Internet Protocol (IP) addresses to one or more devices of the network, the one or more devices being coupled to the network via one or more device interfaces in an UP state to establish an IP connection front the apparatus through the one or more device interfaces on the network to the one or more devices to allow IP connectivity, the addresses being assigned the apparatus wherein an address conflict occurs in a plurality of device interfaces in the UP state;
establishing address precedence rules;
monitoring, by the one or more computer processors, the network for address conflicts between the plurality of device interfaces and providing a signal in response thereto, wherein the IP connection is established before the address conflict is determined; and
selectively analyzing the plural addresses for the plurality of device interfaces in the UP state and terminating one or more device interfaces for the plurality of device interfaces based on the precedence rules and in response to the signal, wherein termination of the one or more device interfaces brings one or more connections to terminate IP connectivity to the one or more device interfaces.

16. The system of claim 1, wherein the one or more predetermined precedence rules comprise a static policy, a longest-prefix policy, a highest-address policy and an interface-identifier policy, the conflict-resolution module adapted to:
determine an address conflict policy from the static policy, a longest-prefix policy, a highest-address policy, and an interface-identifier policy; and
apply the determined address conflict policy to selectively terminate the one or more device interfaces.

17. The system of claim 16, wherein determining the address conflict policy is based on a user selection via a user interface.

18. The apparatus of claim 11, wherein the one or more predetermined precedence rules comprise a static policy, a longest-prefix policy, a highest-address policy and an interface-identifier policy, the apparatus comprising:
fifth means for determining an address conflict policy from the static policy, a longest-prefix policy, a highest-address policy, and an interface-identifier policy; and sixth means for applying the determined address conflict policy to selectively terminate the one or more device interfaces.

19. The apparatus of claim 18, wherein fifth means for determining the address conflict policy is based on a user selection via a user interface.

20. The apparatus of claim 15, wherein the one or more predetermined precedence rules comprise a static policy, a longest-prefix policy, a highest-address policy and an interface-identifier policy, the instructions for:

determining an address conflict policy from the static policy, a longest-prefix policy, a highest-address policy, and an interface-identifier policy; and applying the determined address conflict policy to selectively terminate the one or more device interfaces.

* * * * *

UNITED STATES PATENT AND TRADEMARK OFFICE
CERTIFICATE OF CORRECTION

| | | |
|---|---|---|
| PATENT NO. | : 7,633,855 B2 | Page 1 of 1 |
| APPLICATION NO. | : 11/265917 | |
| DATED | : December 15, 2009 | |
| INVENTOR(S) | : Singh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this

Twenty-first Day of December, 2010

David J. Kappos
*Director of the United States Patent and Trademark Office*